US006624242B2

(12) United States Patent
Curry et al.

(10) Patent No.: US 6,624,242 B2
(45) Date of Patent: Sep. 23, 2003

(54) AQUEOUS DISPERSIONS OF LOW-MOLECULAR WEIGHT, LOW-MELTING AND WATER INSOLUBLE POLYMERS

(75) Inventors: James F. Curry, Clearwater, FL (US); Kolazi S. Narayanan, Wayne, NJ (US); Ronald H. Goehner, Jr., Wayne, NJ (US); Domingo I. Jon, New York, NY (US); George B. Beestman, Wilmington, DE (US)

(73) Assignee: ISP Investments Inc., Wilmington, DE (US)

( * ) Notice: Subject to any disclaimer, the term of this patent is extended or adjusted under 35 U.S.C. 154(b) by 0 days.

(21) Appl. No.: 09/924,191

(22) Filed: Aug. 8, 2001

(65) Prior Publication Data

US 2003/0040569 A1 Feb. 27, 2003

(51) Int. Cl.[7] .............................. C08L 39/08; C08F 6/14; C08J 3/03
(52) U.S. Cl. ........................ 524/808; 524/161; 524/166; 524/504; 528/488; 528/491; 528/502; 528/503
(58) Field of Search ................................ 528/488, 491, 528/502, 503; 524/161, 166, 808, 504

(56) References Cited

U.S. PATENT DOCUMENTS

| | | | | |
|---|---|---|---|---|
| 3,910,846 | A | * | 10/1975 | Azar et al. |
| 4,072,527 | A | * | 2/1978 | Fan |
| 5,041,281 | A | * | 8/1991 | Strobridge |
| 5,200,289 | A | * | 4/1993 | Harrington et al. |
| 5,426,163 | A | * | 6/1995 | Buehler et al. |
| 5,468,598 | A | * | 11/1995 | Miller et al. |
| 6,303,131 | B1 | * | 10/2001 | Narayanan |
| 6,444,212 | B1 | * | 9/2002 | Cavazzuti et al. |
| 6,472,472 | B2 | * | 10/2002 | Jung et al. |
| 2002/0032275 | A1 | * | 3/2002 | Falcone et al. |

* cited by examiner

*Primary Examiner*—Tae H. Yoon
(74) *Attorney, Agent, or Firm*—Walter Katz; William J. Davis; Marilyn J. Maue

(57) ABSTRACT

An aqueous dispersion of (a) 0.1–40% by wt. of a low molecular weight, low melting point, water-insoluble polymer in which the polymer particles have a size <10 microns, and (b) 0.001–30% by wt. of an anionic emulsifier.

6 Claims, No Drawings

AQUEOUS DISPERSIONS OF LOW-MOLECULAR WEIGHT, LOW-MELTING AND WATER INSOLUBLE POLYMERS

BACKGROUND OF THE INVENTION

1. Field of the Invention

This invention relates to aqueous dispersions of a low molecular weight, low melting point, water-insoluble polymer, and, more particularly, to a process of making such dispersions for use in water-resistant compositions.

2. Description of the Prior Art

The art has long recognized the need to provide aqueous dispersions of water-insoluble polymers which can be used in water-resistant compositions such as seed coatings, water-based protective coatings, adhesive binders, water-based formulations for water-proofing, suspension concentrates, sustained release formulations, water-based formulations for UV protection, agricultural formulations and personal care products.

Accordingly, it is an object of this invention to provide aqueous dispersions of water-insoluble polymers.

Another object herein is to provide a process for making such aqueous dispersions of water-insoluble polymers.

SUMMARY OF THE INVENTION

What is described herein is an aqueous dispersion of (a) 0.1–40% by wt. of a low molecular weight, low melting point, water-insoluble polymer in which the polymer particles have a size <10 microns, and (b) 0.001–30% by wt. of an anionic emulsifier; preferably wherein (a) is 5–30% and (b) is 2–20%; most preferably (a) is 10–20% and (b) is 5–10%. Suitably (a) is a vinyl pyrrolidone copolymer; preferably, (a) is a vinyl pyrrolidone-alkylated or vinyl acetate copolymer.

In the aqueous dispersion of the invention, suitably (b) is sodium lauryl sulfate, calcium dodecyl benzene sulfonate, tristyryl ethoxylated phosphoric acid or salts thereof, polymeric anionic emulsifiers including lignin sulfonate, neutralized methyl vinyl ether maleic acid half-ester, and polyacrylic acid with >10% acrylic acid, or salts thereof.

In the aqueous dispersion herein (a) suitably, has a molecular weight <100,000, and a pyrrolidone content >10%.

As a feature of the invention, there is provided a process of making the desired aqueous dispersion by heating the polymer and anionic emulsifier in water at a temperature close to the Tg of the polymer under high shear mixing conditions, suitably at 40–90° C., preferably 50–80° C., and, most preferably at 60–75° C., and wherein the polymer and anionic emulsifier are present in amounts of 1–40 wt. % and 0.001–30 wt. %, respectively.

DETAILED DESCRIPTION OF THE INVENTION

In accordance with the invention, there is provided herein an aqueous dispersion of a water-insoluble polymer for use in various commercial applications and formulations. The dispersion is made herein by an advantageous process in which the molten polymer is dispersed in an anionic emulsifier and water as a fine suspension. In the preferred embodiment of the invention, the water-insoluble polymer is heated to close to its Tg, then water and the anionic emulsifier are heated and added to the molten polymer while stirring vigorously under a high shear. The resultant dispersion of the polymer is a homogeneous micro-dispersion in which the polymer particles have a size <10 microns, preferably 0.1–2µ.

The micro-dispersion thus prepared then can be added conveniently to a particular formulation for use in a commercial application at a suitable dilution ranging from 1:10 to 1:1000.

Suitable water-insoluble polymers include, but are not limited, to the following:

Vinyl pyrrolidone copolymers like alkyl grafted PVP (Ganex®/Agrimer® AL 30, 22, 25, WP 660) Agrimer® VA (PVP-vinyl acetate copolymers).

Others: Beeswax and alkyl vinyl ether-maleic acid half-ester polymers.

Preferred polymer molecular weight: <100,000, and pyrrolidone content >10%.

Suitable anionic emulsifiers include, but not limited to, low molecular weight sodium lauryl sulfate, calcium dodecyl benzene sulfonate, tristyryl ethoxylated phosphoric acid or salt; polymeric anionic emulsifiers such as lignin sulfonate, preferably with a molecular weight >6000, methyl vinyl ether-maleic acid half-ester partially neutralized; and water soluble polyacrylates with at least 10% acrylic acids/salts.

Suitable relative amounts of polymer and anionic emulsifier are: polymer 0.1–40%, preferred 5–30%, most preferred 10–20%, in water. Anionic emulsifiers or polymeric anionic emulsifiers: 0.001–30% by weight of the polymer to be dispersed, preferably 0.002–20%, most preferred 0.005–10%.

The temperature of heating is close to the glass transition temperature or molten/softening point, usually between 40–90° C., preferably 50–80° C., most preferably 60–75° C.; and under high shear mixing.

The following examples describe the invention more particularly:

Examples 1 through 18 illustrate the preparation of fine, aqueous dispersions of water-insoluble polymers such as Agrimer® AL (alkyl-grafted polyvinyl pyrrolidone copolymers) with anionic emulsifiers, and uses of such dispersions.

EXAMPLE 1

A solid version of Ganex® 516 or Agrimer® AL 25 (vinyl pyrrolidone grafted with 50% $C_{16}$ alpha-olefin) was prepared from a commercially available 50% solution of the polymer in isopropanol. 500 g of the commercial 50% IPA solution then was charged into a 1-l, three-necked round-bottom flask equipped with a thermometer, a reflux condenser and a mechanical stirrer. The solvent was stripped under vacuum (2–5 mm Hg) at a temperature below 50° C. After 70–80% IPA was removed, about 400 g water was introduced and the remaining IPA was azeotroped off leaving a thick suspension of the polymer in water. A portion (about 100 g) of the thick suspension (Composition 1A) containing about 60% solid was used to prepare an aqueous dispersion. The remaining portion was transferred to a vacuum oven and water was removed at 1–2 mm Hg pressure and <60° C. over a period of 24 hours. The solid produced was ground in an electrical grinder to produce a quantitative amount of free-flowing solid (Composition 2A).

EXAMPLE 2

8.5 g of Composition 1A of Example 1 was diluted with 50 g water in a 250 ml beaker. 0.66 g of an emulsifier, sodium lauryl ether-2-sulfate was added. The mixture was agitated with a magnetic stirrer, and the composition was further diluted to a total weight of 100 g. The product was transferred into a 2 oz. stoppered bottle and stored in an oven maintained at a temperature of about 50° C. for a period of 24 hours.

A stable slightly hazy dispersion was produced. The dispersion remained without separation at room temperature for a period of one month. This dispersion was suitable for coating many substrates, like wood, skin, seeds, and granules, to provide rainfastness or protection against water as well as to keep the hydrophobic bioactive materials suspended in solution.

EXAMPLE 3

5 g of Composition 2A was suspended in 0.43 g of sodium lauryl ether-2-sulfate in a 2 oz. stopperd bottle and the sample was made up to 100 g with water. The sample was stored in an oven maintained at a temperature of about 50° C. for a period of 24 hours. A stable, hazy dispersion was produced. The dispersion remained without separation at room temperature, observed for a period of one month.

EXAMPLE 4

3 g Agrimer® AL 30 (vinyl pyrrolidone alpha-olefin graft copolymer produced with 20% vinyl pyrrolidone and 80% $C_{20}$ alpha-olefin) was weighed into a one oz. stoppered bottle and suspended in 11.85 g water containing 0.15 g Reax 85A (lignin sulfonate with molecular weight ~10,000). The suspension was kept in an air-oven at 75° C. for 6 hours. The contents were mixed occasionally, removed from the oven and stored at room temperature. The product was a homogeneous dispersion with a polymer particle size <5 microns.

EXAMPLE 5

Example 4 was repeated except that 0.15 g lignin sulfonate was replaced by 0.15 g Soprophor 3 D 33 (tristyryl phenyl ethoxylated phosphoric acid). The polymer formed a homogeneous dispersion with a particle size <5 microns.

EXAMPLE 5A

Example 5 was repeated except that Agrimer® AL 30 was replaced by Agrimer® WP 660 or Ganex® WP 660. A homogeneous, stable dispersion was produced.

EXAMPLE 6

Example 4 was repeated except 0.15 g lignin sulfonate was replaced by 0.20 g Geropon SS 075, in an amount of 75%. A homogeneous dispersion with particle size <5 microns was obtained.

EXAMPLE 7

Example 4 was repeated except that 0.15 g of lignin sulfonate was replaced by 0.25 g Ninate 401 A, 60% (calcium dodecylbenzene sulfonate). The polymer formed a homogeneous dispersion with a particle size <5 microns.

EXAMPLE 7A

Example 7 was repeated except that the polymer was replaced with beeswax and the emulsifier was 1:1 mixture of Igepal CO 630 and Ninate 401 A. A stable dispersion was produced.

EXAMPLE 8

Example 4 was repeated except that 0.15 g lignin sulfonate was replaced with 0.15 g Soprophor 3 D 33 (tristyryl phenyl ethoxylated phosphoric acid). The polymer formed a homogeneous dispersion with a particle size <5 microns.

EXAMPLE 9

Example 7 was repeated except that 0.5 g Ninate 401 A, 60% (calcium dodecylbenzene sulfonate) was used. The polymer formed a homogeneous dispersion with a particle size <5 microns.

EXAMPLE 10

5.72 g Reax 85 A was dissolved in 237 g water in a 1-l beaker. The solution was placed in a Waring blender jar and placed in the oven at 75° C. In a separate capped bottle, 57.15 g Agrimer AL 30 was placed in the oven at 75° C. After 3 hours, the Waring blender jar with the Reax 85 A* (lignin sulfonate) was placed in the Waring blender. The molten Agrimer AL 30 then was poured into the Reax 85 A. That solution at 75° C. was sheared for 30 min. at maximum speed. The resulting suspension was stable and produced a particle size distribution with less than one micron mean diameter. The suspension was stable for 24 hours without separation; and was a non-settling, uniform dispersion even after 4 weeks.

* The Reax 85 A had molecular weight of 10,000, an index of 0.8 and a salt content of 4.8%.

EXAMPLE 11

Example 10 was repeated on a smaller scale, using other lignin sulfonates in the place of Reax 85 A. 2.0 g of the following lignin sulfonates were dissolved in 78 g water in separate jars and kept in an oven at 75° C. 20 g Agrimer AL 30 was melted in 7 separate capped bottles. Small scale Waring blender cups and jars were kept at 75° C. The molten Agrimer AL 30 was mixed in the blender with the hot lignin sulfonate solutions at high shear for 5 min.

The lignin sulfonates were:

Reax 85 A (Mol wt 10,000, sulfonation index 0.8, salt content 4.8%);
Polyfon H (Mol wt 4300, sulfonation index 0.7, salt content 4%);
Polyfon T (Mol wt 2900, sulfonation index 2.0, salt content 8.6%);
Polyfon O (Mol wt 2400, sulfonation index 1.2, salt content 5%);
Polyfon F (Mol wt 2900, sulfonation index 3.3, salt content 12.7%);
Reax 88B (Mol wt 3100, sulfonation index 2.9, salt content 8.6%);
Reax 100 M (Mol wt 2000 sulfonation index 3.4, salt content 6.5%);
Reax 825 E ( Mol wt 3700, sulfonation index 3.4, salt content 5.4%).

The quality of suspensions were good but Reax 85 A was better.

EXAMPLE 12

1.9 g of 25% aqueous solution of disperse (commercial sample 5120 [26.5% solid], pilot plant sample, with 27% esterification, Et/Bu at 2.0,) was dissolved/diluted in 93.1 g water in a capped bottle and was kept in an oven at 75° C. 5.0 g Agrimer AL 30 was melted in a separate capped bottle in an oven at 75° C. Small scale Waring blender cups and jars were kept at 75° C. The molten Agrimer AL 30 was mixed in the blender with the hot disperse solution with high shear for 5 min. A fine dispersion of Agrimer AL 30 in water with bimodal particle size distribution with 90% particle size less than 6 microns (volume mean diameter) was produced.

EXAMPLE 13

Agrimer® AL 22 Suspensions 3.8 g of 25% aqueous solution of disperse (commercial sample 5120, pilot plant sample, with 27% esterification, Et/Bu at 2.0,) was dissolved/diluted in 86.2 g water in a capped bottle and was kept in an oven at 75° C. 10.0 g Agrimer AL 22 was placed in a separate capped bottle in an oven at 75° C. Small scale Waring blender cups and jars were kept at 75° C. The liquid Agrimer AL 22 was mixed in the blender with the hot disperse solution with high shear for 5 min. A fine dispersion of Agrimer AL 22 in water with slight bimodal particle size distribution with 90% particle size less than 3 microns (volume mean diameter) was produced.

EXAMPLE 14

Agrimer® AL 25 Suspensions 3.8 g of 25% aqueous solution of disperse (commercial sample 5120, pilot plant sample, with 27% esterification, Et/Bu at 2.0,) was dissolved/diluted in 86.2 g water in a capped bottle and was placed in an oven at 75° C. 10.0 g solid Agrimer AL 25 (composition 2A described in Example 1) was melted in a separate capped bottle in an oven at 75° C. Small scale Waring blender cups and jars were kept at 75° C. The molten Agrimer AL 25 was mixed in the blender with the hot disperse solution with high shear for 5 min. A fine viscous dispersion of Agrimer AL 25 in water with particle size distribution with 90% particle size less than 3 microns (volume mean diameter) was produced.

EXAMPLE 15

Agrimer® VA 5 Suspensions 7.5 g of 25% aqueous solution of disperse (commercial sample 5120, pilot plant sample, with 27% esterification, Et/Bu at 2.0,) was dissolved/diluted in 72.5 g water in a capped bottle and was placed in an oven at 75° C. 40 g commercially available 50% ethanolic solution of Agrimer VA 5 was placed in a separate capped bottle in an oven at 45° C. Small scale Waring blender cups and jars were kept at 75° C. The hot solution of Agrimer VA 5 was mixed in the blender with the hot disperse solution with high shear for 5 min. A fine clear yellow suspension of Agrimer VA 5 in water with particle size distribution with 90% particle size less than 4 microns (volume mean diameter) was produced. The suspension was analyzed to contain less than 10% residual ethanol. The residual ethanol was removed to <0.5% by flushing dry nitrogen for a period of 24 hours.

EXAMPLE 16

22.6 g of 26.5% aqueous solution of disperse (commercial sample 5120 [26.5% solid], pilot plant sample, with 27% esterification, Et/Bu at 2.0 was dissolved/diluted in 217.4 g water in a Waring blender jar and was kept in an oven at 75° C. 60.0 g Agrimer AL 30 was melted in a separate capped bottle in an oven at 75° C. for a period of 3 hours. Molten Agrimer AL 30 was poured into the aqueous disperse at 75° C. and mixed with high shear for 5 min. The suspension was foamy. At this point, 0.2 g Rhodofac D 425 antifoam was added. Suspension continued to thicken. After 10 min. of shear, the thick suspension was poured hot in a labeled bottle. The last amount of the suspension was removed by a spatula. After cooling to room temperature, the suspension became a soft solid that will not pour, the solid polymer/dispersant imbibing more than three times it's weight of water.

The concentrated 20% Agrimer AL 30 suspension described above could be easily diluted in water and shear-mixed to produce stable free flowing dispersions containing desired amount of solids (10% or less).

Following dilutions were prepared to produce free flowing low viscous aqueous suspensions.

EXAMPLE 16A

One part (1 g) of suspension of Example 16 was diluted with two parts of water (2 g) and mixed and vortexed to produce a fine suspension containing 6.67% Agrimer AL 30 with submicron particle size distribution.

EXAMPLE 16B

One part (1 g) of suspension of Example 16 was diluted with two parts of water (3 g) and mixed and vortexed to produce a fine suspension containing 5.0% Agrimer AL 30 with submicron particle sized distribution.

EXAMPLE 16C

One part (1 g) of suspension of Example 16 was diluted with two parts of water (4 g) and mixed and vortexed to produce a fine suspension containing 4.0% Agrimer AL 30 with submicron particle sized distribution.

EXAMPLE 16D

One part (1 g) of suspension of Example 16 was diluted with two parts of water (9 g) and mixed and vortexed to produce a fine suspension containing 2.0% Agrimer AL 30 with submicron particle sized distribution.

EXAMPLE 17

Use of polymer dispersions for rainfastness. Meltaldehyde suspension concentrates.

Following suspension concentrates [17A, 17B, 17C and 17D] containing 25% Metaldehyde were prepared using the general procedure described below:

TABLE 1

| Formulations/Ingredients | 17A dISPerse/Agrimer 30 | 17B Reax 85A/Agrimer 30/Agrimer AL 30 | 17C disperse/Agrimer AL 30/Reax 85A | 17D disperse/Agrimer 30/Agrimer AL 30 | Commercial slug fast (oil based suspension) |
|---|---|---|---|---|---|
| Metaldehyde | 25.1 | 25.1 | 25.1 | 25.1 | 25% |
| Disperse 5120 | 2.0 | 2.0 | 2.0 | 2.0 | |

TABLE 1-continued

| Formulations/ Ingredients | 17A dISPerse/ Agrimer 30 | 17B Reax 85A/ Agrimer 30/ Agrimer AL 30 | 17C disperse/ Agrimer AL 30/ Reax 85A | 17D disperse/ Agrimer 30/ Agrimer AL 30 | Commercial slug fast (oil based suspension) |
|---|---|---|---|---|---|
| (26.5% solid) | | | | | |
| Agrimer 30 | 2.6 | 2.6 | 0 | 2.6 | |
| Reax 85 A/Agrimer AL 30, 19%[1] | 0 | 15.1 | 15.1 | 0 | |
| DISPerse/Agrimer AL 30, 20%[2] | 0 | 0 | 0 | 15.1 | |
| Propylene glycol | 3.51 | 3.51 | 3.51 | 3.51 | |
| Rhodasil | 0.2 | 0.2 | 0.2 | 0.2 | |
| Proxel | 0.25 | 0.25 | 0.25 | 0.25 | |
| Kelzan (1% in Water) | 15.1 | 15.1 | 15.1 | 15.1 | |
| Water added | 51.24 | 36.14 | 38.74 | 36.14 | |
| Total | 100.00 | 100.00 | 100.00 | 100.00 | |

[1]Composition shown in Example 10
[2]Composition shown in Example 16

Preparation. The suspension concentrate compositions shown in 17A, 17B, 17C and 17D (excluding the 1% Kelzan), were wet-milled using an Eiger Machinery Model #100 before testing. Prior to feeding into the wet mill they were mixed using a homogenizer. Typically, a 70% to 80% loading of 0.1 cm zirconium oxide beads was used and concentrates were milled for 10 minutes at 3000 rpm. The temperature of the cooling bath was typically −5° C. to 0° C., which gave a milling temperature between 15° C. and 21° C. for the concentrates. The operating conditions of the wet-mill resulted in about 19 passes of the concentrate per minute. 15.1 g 1% Kelzan solution was added to 94.9 of the wet-milled concentrates prepared as above.

The above formulations produced fine suspensions with particle size distribution, at 90% less than 2.5 microns, with mean volume diameter less than 1.5 microns.

Applications

Rainfastness Evaluation

The formulations 17A, 17B, 17C, 17D and commercial slug fast were evaluated for rainfastness as follows:

The formulations were diluted at 1:60 with deionized water and the Metaldehyde was well suspended. Glass microscopic slides (1×4 inch) were dipped half way into the diluted suspensions and were air-dried. After drying 5 mL water was poured over one side on the slides from a graduated pipette, slides were dried again and were examined under the microscope to assess the extent of adhesion or wash off of the Metaldehyde crystals.

The Metaldehyde from the commercial Slugfast formulation was completely washed off. Formulation 17D retained >95% of the original solids on the slide. Formulations 17A, 17B and 17C retained 75–85% of the original solids.

EXAMPLE 18

Use of Disperse/Agrimer® AL 30/Agrimer® 30 in Seed Coating

A suspension concentrate composition shown below, containing 41% chlorothalonil suspension, was prepared by the procedure described in Example 17. Xanthan was added after milling to give a final xanthan concentration of 0.16%.

| Ingredient | Composition, % |
|---|---|
| Chlorothalonil | 41.0 |
| Disperse (25% solution) | 2.0 |
| Agrimer 30 | 2.6 |
| Disperse/Agrimer AL 30 (20%)[2] | 15.1 |
| 2-ethylhexylsulfate | 1.0 |
| Propylene glycol | 4.2 |
| Proxel GXL | 0.44 |
| Rhodorsil 426R | 0.44 |
| Xanthan | 0.16 |
| Water | Qs to 100.00 |

[2]Composition of Example 16

One part of the above suspension was diluted with 2 parts of an aqueous solution containing 20% Chromakote Blue dye. 750 grams of soybean seeds (size 2760 seed per lb.) were charged into the Hege 11 Liquid Seed Treater. 3 mls of diluted Formulation (as above) was applied to the seeds, which were then allowed to dry on a glass tray for 30 min. Adhesivity: Three 250 g portions of the treated seed were each placed on 10 mesh round sieve (8 in. dia., full height). The three sieves were stacked on a CSC Scientific Sieve Shaker, Model #18480, and were shaken for 15 minutes at setting #7. The weight of the dust produced from shaking the treated seeds was 40 mg (ca: a retention >85%).

A formulation similar to the above, but without disperse/Agrimer AL 30 produced 120 mg dust in the Adhesivity test.

A. Other Applications

The compositions shown in Examples 10 and 12–16, are effective for formulating personal care products including water-based UV protectants, such as sunscreen and alpha hydroxy acid formulations, and with film-forming water proofing polymers.

B. Sustained Release Formulation

The compositions shown above also are effective for formulating sustained release alpha-hydroxy acids (lactic acid/glycolic acid), e.g. in the presence of Agrimer AL 30 and diSPerse.

While the invention has been described with particular reference to certain embodiments thereof, it will be understood that changes and modifications may be made which are within the skill of the art. Accordingly, it is intended to be bound only by the following claims, in which:

What is claimed is:

1. A process of making a stable, aqueous dispersion of (a) 0.1–40% by wt. of a water-insoluble copolymer which is an alkylated vinyl pyrrolidone in which the polymer particles have a size <10 microns, and (b) 0.001–30% by wt. of an polymeric anionic emulsifier, which comprises forming molten polymer at a temperature of 40–90° C., heating the anionic emulsifier in water to about the same temperature, mixing the molten polymer and the hot aqueous emulsifier together under high shear mixing conditions.

2. A process according to claim 1 wherein (a) is 5–30% and (b) is 0.002–20%.

3. A process according to claim 1 wherein (a) is 10–20% and (b) is 0.005–10%.

4. A process according to claim 1 wherein (b) is polymeric anionic emulsifiers including lignin sulfonate, neutralized methyl vinyl ether maleic acid half-ester, and polyacrylic acid with <10% acrylic acid, or salts thereof, and mixtures of the above.

5. A process according to claim 1 wherein said temperature is 50–80° C.

6. A process according to claim 1 wherein said temperature is 60–75° C.

* * * * *